United States Patent [19]
Schukei et al.

[11] 3,898,467
[45] Aug. 5, 1975

[54] METHOD AND APPARATUS FOR CONTINUOUS MONITORING AND CONTROL OF NEUTRON ABSORPTION PROPERTIES OF CHEMICAL SHIM WITH TEMPERATURE COMPENSATION

[75] Inventors: Glen Elwin Schukei, South Windsor; Joseph Edward Kowles, Glastonbury, both of Conn.

[73] Assignee: Combustion Engineering, Inc., Windsor, Conn.

[22] Filed: Mar. 18, 1974

[21] Appl. No.: 451,725

[52] U.S. Cl. .................. 250/390; 176/22; 250/391
[51] Int. Cl. ............................................. G01t 3/00
[58] Field of Search ........... 250/358, 359, 360, 390, 250/391, 392, 428, 429, 432, 434, 435, 436, 437; 176/22, 86 G, 86 L

[56] References Cited
UNITED STATES PATENTS

| | | | |
|---|---|---|---|
| 3,578,562 | 5/1971 | Johnson et al. | 250/391 X |
| 3,602,711 | 8/1971 | Arora et al. | 250/429 |

*Primary Examiner*—James W. Lawrence
*Assistant Examiner*—Davis L. Willis
*Attorney, Agent, or Firm*—Stephen L. Borst

[57] ABSTRACT

An apparatus and method of operation thereof, to continuously monitor and control the neutron absorption properties of chemical shim used in regulating reactivity of a pressurized water nuclear reactor. Coolant-moderator fluid, containing soluble chemical shim with a neutron absorption property is continuously passed through a chamber having at least one neutron detector spaced from a neutron source of known strength. Utilizing the neutron absorptiometry principle, a signal relating to the concentration of the chemical shim in the coolant-moderator is derived. In addition, the temperature of the sample of coolant is obtained and a temperature compensation signal is generated. The signal related to chemical shim concentration is modified by the temperature compensation signal to correct for temperature related effects. The corrected signal is then applied to a readout and alarm device so that constant monitoring of the shim concentration may be accomplished; additionally, the signal may be applied to maintain the concentration of the chemical shim in the coolant-moderator at a desired level.

9 Claims, 4 Drawing Figures

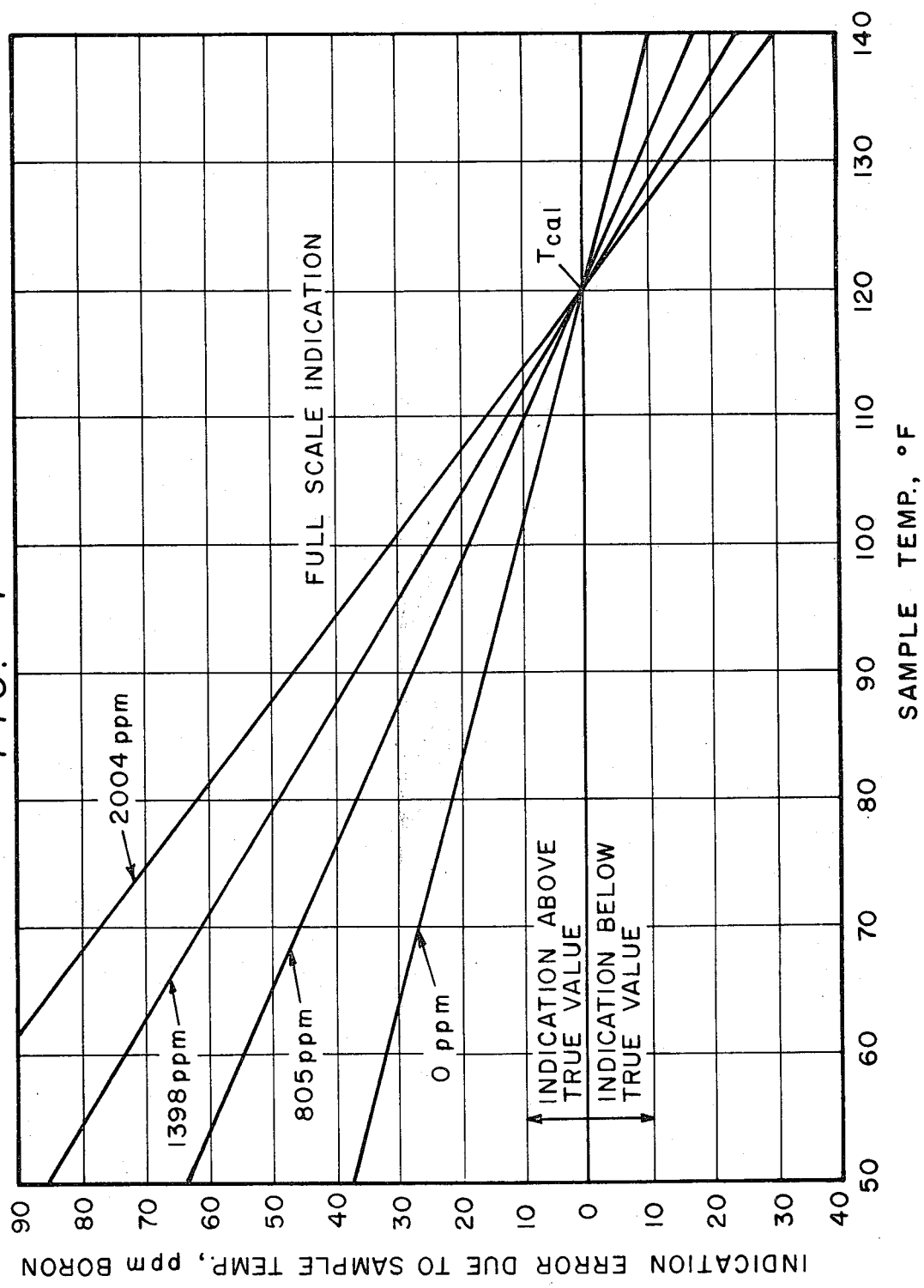

METHOD AND APPARATUS FOR CONTINUOUS MONITORING AND CONTROL OF NEUTRON ABSORPTION PROPERTIES OF CHEMICAL SHIM WITH TEMPERATURE COMPENSATION

BACKGROUND OF THE INVENTION

In pressurized water nuclear reactors, reactivity control for the power level regulation is accomplished by means of mechanical control elements, used to determine the geometry of heterogeneous netron absorbers within the reactor core. In order to supplement the use of the mechanical control elements for purposes of reactivity control, such as necessitated by operation transients, a soluble neutron absorber is introduced into the coolant-moderator. The soluble neutron absorber is a chemical shim in the coolant-moderator which permits improved core performance while increasing flexibility of the fuel assembly mechanical design through reduced control rod requirements.

The use of neutron absorption properties of chemical shim for reactivity control in pressurized water reactors contributes substantially to the reduction of the cost of power production. Such chemical shim neutron absorber control has advantages over other types of control systems in that it reduces the cost of achieving control by simplification of mechanical control apparatus, improves power distribution and increases fuel utilization capabilities.

Chemical shim may be proved in pressurized water reactors by the inclusion of a soluble neutron absorber such as boric acid in the coolant-moderator. In order to sustain the chain reaction and prevent the chain reaction from running away, the number of neutrons available for inducing fission must be kept within fine limits; i.e., the average numbers of neutrons produced by fission must be substantially equal to the number of neutrons captured to produce fission, captured by the moderator, and leaked from the core. The chemical shim with its nutron absoprtion properties acts as the medium by which the neutrons are removed from the fission cycle, thus maintaining control of the number of neutrons available for fission and enabling the reactivity to be kept within the desired narrow limits.

To effectively use chemical shim as a method of reactivity control, it is necessary to know the neutron absorption properties of the coolant-moderator as a function of time. This requires a continuous on-line monitoring device which is simple, accurate, reliable, and readily adaptable to provide the related control function. Techniques available for measurement of the neutron conecntration properties of chemical shim in water include chemical titration, photometric techniques, and neutron absorption. Of the three, neutron absorption is the technique most readily meeting all of the desired criteria.

It has been well-known in the art of neutron absorption that neutron absorption is temperature dependent since thermal neutron reaction cross sections are in general a function of the neutron energy. The neutron energy in turn is a function of the temperature of their surroundings, thus the designation "thermal neutrons." More specifically, thermal neutrons are neutrons whose average kinetic energy has been moderated to correspond to the average kinetic energy of the atoms of molecules of the containing medium; i.e., neutrons in thermal equilibrium with the atoms or molecules of the containing medium. At higher temperatures, the average kinetic energy is higher resulting in a decreased neutron capture cross section. A second influence that the temperature of the sample has on the neutron absorption capability of the sample is the effect of sample density. As the sample is heated, the sample tends to expand with a resultant decrease in sample density. Consequently, the bulk capture cross section of the coolant decreases since there are fewer absorption sites per unit volume.

Recognizing that the coolant sample temperature could affect the determination of chemical concentration of the absorbent chemical shim, one prior art system has chosen to remove sample temperature variations by making neutron absorption measurments at a constant sample temperature. In order to do this, the prior art system passes the coolant sample through an out-of-contact heat exchanger immersed in a large heat sink. For the operation of this typical prior art apparatus, a 7KV-A electrical heater is required to maintain the heat sink at a constant temperature. The coolant sample is passed through the heat exchanger which is submersed in the heat sink thak so that the coolant temperature is adjusted to that of the medium of the heat sink. This system, however, has the plurality of disadvantages that: (1) the circuitous journey that the coolant sample must take through the heat exchanger in order to bring its temperature into equilibrium with the temperature of the heat sink delays the time that it takes for the sample to be transported from the coolant system to the concentration analyzer; (2) the necessary transit time cannot be shortened by increased flow rates since a certain minimum residence time in the heat exchanger is required to assure that the coolant sample has achieved temperature equilibrium with the heat sink; and (3) the maintenance of a large heat sink with a heat exchanger and an electrical heater is a costly undertaking. It can be seen that this prior art equipment cannot be modified to make the concentration analyzer more rapidly responsive to changes in chemical shim concentration and therefore this prior art system is not adaptable for use in reactor power plant procedures which require a rapidly responsive indication of coolant chemical shim concentration. A rapidly responsive chemical shim concentration indication finds special application during the periods when the nuclear reactor is maintained in subcritical cold standby or during subcritical startup.

SUMMARY OF THE INVENTION

An apparatus and method of operation have been developed to continuously monitor the concentration of a neutron absorbing chemical shim dissolved in the coolant of a nuclear reactor. The apparatus and method provide for the simultaneous monitoring of the temperature of the sample and for the continuous generation of a compensation signal which is related to the error of the chemical shim concentration determination introduced by the effects of temperature on the neutron absorption properties of the chemical shim. A thermocouple or some equivalent temperature monitoring device generates a temperature which is related to the temperature of the sample. This temperature signal is compared to a calibration temperature to generate a temperature displacement signal which is commersurate with the amount by which the actual temperature of the sample varies from the calibration temperature. The temperature displacement signal is then multiplied by the uncorrected chemical shim concentration signal. To the resultant signal is then added the temperature displacement signal to generate a final compensation signal which is commensurate with the magnitude of correction necessitated by the effect the temperature has on the neutron absorption properties of the sample. Finally, the uncorrected signal modified by adding the compensation signal to obtain the corrected chemical shim concentration signal which represents the actual chemical properties of the sample.

BRIEF DESCRIPTION OF THE DRAWINGS

FIG. 3 is a detailed schematic diagram of the measurement, signal conditioning, and temperature compensation portions of this invention.

FIG. 4 is a multiplicity of plots illustrating the linear dependence of the error in indicating the true chemical concentration of the borated sample as a function of temperature of the sample.

DESCRIPTION OF THE PREFERRED EMBODIMENT

It has been discovered that the variation in chemical shim concentration which is due to temperature effects is a linear function described generally by the equation $E = K_1 \Delta T + K_2 \Delta T \times PPM$ where $E$ is the error in concentration, $\Delta T$ is the variation in temperature from some preselected calibration temperature $T_{cal}$, PPM is the uncorrected concentration in parts per million and $K_1$ and $K_2$ are appropriate constants determined by the particular chemical shim and the particular chemical shim concentration analyzer used. For example, $K_1$ and $K_2$ are 0.54 PPM/°F and $5 \times 10^{-4}$ PPM/°F-PPM respectively for boron and the chemical shim measuring device described hereinbelow. FIG. 4 is a multiplicity of plots for various boron shim concentrations illustrating the linear relation between boron error conecntration and temperature of the sample liquid containing the boron shim for the chemical shim measuring device described below.

Figure 1:
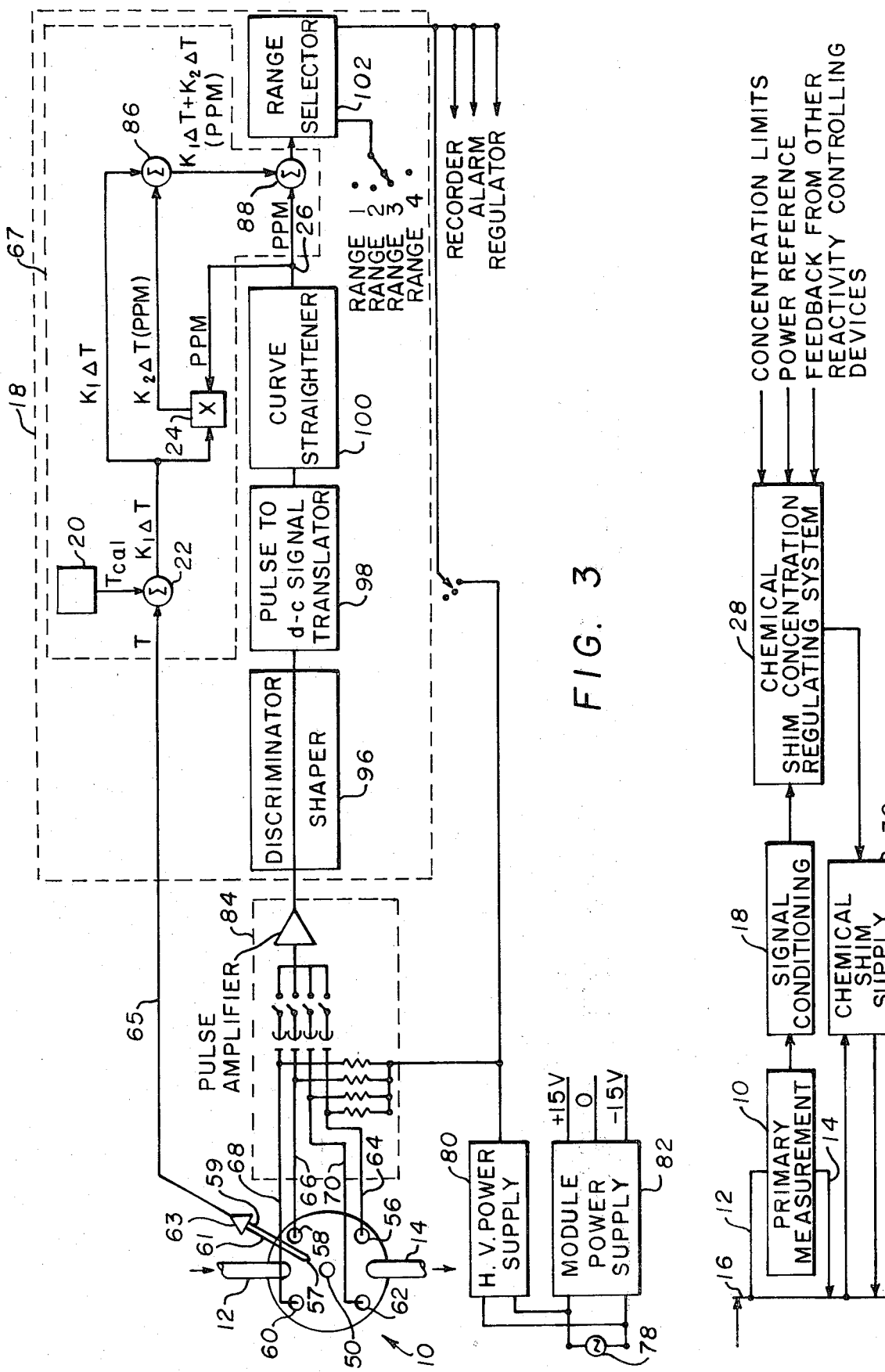
FIG. 1 is a general schematic diagram of the chemical shim absorption property concentration monitoring and regulating system of this invention.

Referring now to FIG. 1 which is a schematic diagram of a chemical shim neutron property concentration monitoring and regulating system containing the temperature conpensating system of this invention. A primary measurement means 10 is provided having an inlet conduit 12 and an outlet conduit 14 connnected between the reactors primary coolant-moderator loop 16 and the primary measurement means 10. The primary measurement means 10 develops a primary signal which is relayed to a signal conditioning means 18 where the primary signal is transformed into a signal representative of the chemical shim neutron absorption property within the coolant-moderator corrected for temperture affects. The signal representative of the shim concentration absorption properties is then available for alarm signaling, continuous concentration monitoring, and automatic (or manual) concentration regulation.

The conditioned signal may additionally be used to regulate the chemical shim absorption property concentration within the coolant-moderator. The conditioned signal is sent to a chemical shim absorption property concentration regulation system 28. The regulation system 28 also received signals representative of reactivity demand conditioned upon circumstances within the reactor environment, such as allowable concentration limits, power reference from the steam supply system, and feedback from other reactivity controlling devices (e.g., control rods, reflector elements, moderator level). By comparing the information from these signals, a running record of the reactivity demand within the system may be obtained and optimum reactivity adjustments may be made for various changes in power demand or to compensate for burn-up of chemical shim absorption properties. Adjustment in reactivity is made by using the combined information to vary the concentration of chemical shim absorption properties in the coolant-moderator by effecting the chemical shim supply 30 to add to or removed from the primary coolant-moderator loop 16 a portion of the chemical shim.

Figure 2:
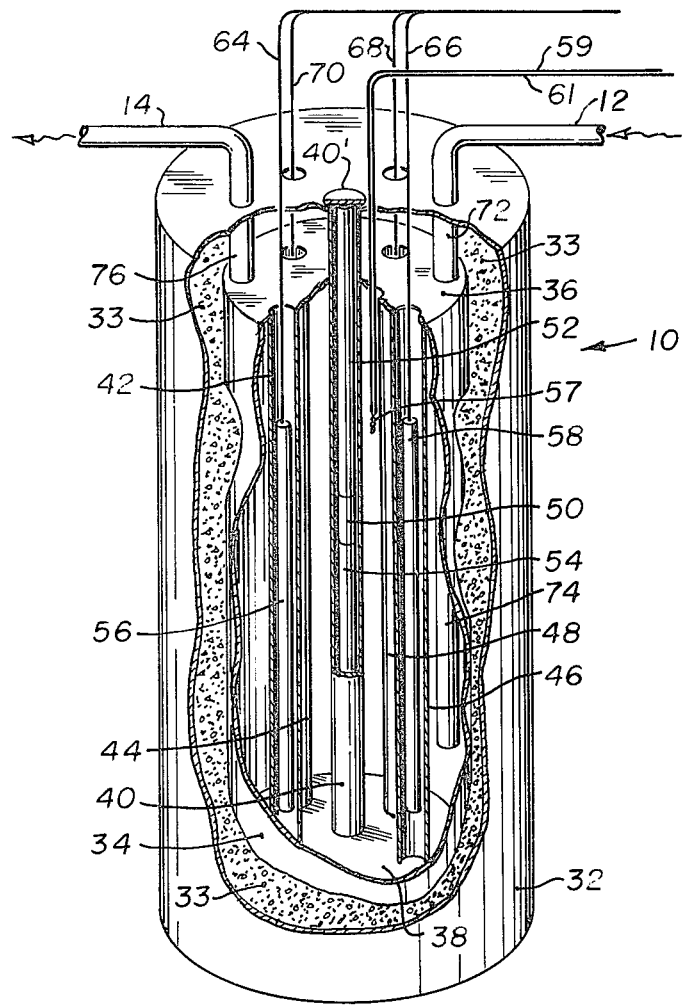
FIG. 2 is a perspective view, partly in section, of the measurement chamber of a typical chemical shim concentration analyzer.

FIG. 2 is a detailed view of a typical chemical shim concentration analyzer 10 as described in U.S. Pat. No. 3,578,562 issued to L. M. Johnson et al. Within a housing 32 filled with radiation shielding material 33, such as concrete or paraffin, is located a metal cylinder 34 having its ends sealed by plates 36, 38. Extending between the end plates 36, 38 and fixed thereto as by welding are tubes 40, 42, 44, 46 and 48. The central tube 40 extends through the upper end plate 36 and through the top of housing 32 where it is sealed by a removable cap 40'. A neutron source 50 is located within the central tube 40, the source 50 being supported by spacer means 52, 54 formed of a plastic type material such as Bakelite. Tubes 42, 44, 46, and 48 are geometrically located aquidistant from the central source containing tube 40. Within these tubes are located neutron detectors of any well-known type 56, 58, 60, 62 only two of which are shown in FIG. 2. Cables 64, 66, 68 and 70 extend from their respective detectors 56, 58, 60 and 62 through the housing 32 where they pass to signal conditioning means.

In order to pass the coolant-moderator to the analyzer 10, conduit means intersecting the primary coolant-moderator loop 16 are in fluid communication with metal cylinder 34. An inlet conduit 12 and an outlet conduit 14 pass through the housing 32. The inlet conduit 12 has a portion 72 which passes through the upper end plate 36 of the cylinder 34 and terminates at portion 74 some distance above the lower end plate 38. The outlet conduit 14 connects a portion 76 with the upper end plate 36 and is in fluid communication with the interior of the metal cylinder 34. With this arrangement, the outlet conduit portion 76 draws liquid from the top of the cylinder 34 while the inlet conduit portion 74 admits liquid at the bottom of the cylinder 34. This assures that there will be liquid in the cylinder 34 at all times (for an added radiation shielding factor) and that there will be adequate fluid mixing throughout the interior thereof. A drain plug (not shown) may be provided in the bottom of the cylinder 34 to permit the cylinder to be drained when desired. A temperature probe such as a suitable thermocouple 57 with leads 59, 61 is positioned in the metal cylinder 34 and is exposed to the liquid flowing therethrough.

Leads 59, 61 lead to an amplifier 63 shown in FIG. 3. The cables 64, 66, 68 and 70 lead to signal conditioning means 18 also shown in FIG. 3. Power for the signal conditioning means 18 is supplied from a standard alternating signal supply 78 to a high voltage power supply 80 and a module power supply 82. The high voltage power supply 80 powers the remote preamplifer 84 while the module power supply 82 powers the additional components of the signal conditioning means 18. The signal conditioning means 18 additionally contains a discriminator-shaper 96, a pulse-to-DC signal translator 98, a curve straightener 100, a temperature compensation circuit 67 and a multiple stage range selector 102. The temperature compensation circuit 67 includes operational amplifer 22 which acts as a comparator, an analog multiplier 24 and operational amplifiers 86, 88 which both act as summers.

The operation of the apparatus of this invention is as follows. A continuous sample of coolant-moderator is withdrawn from the primary coolant-moderator loop 16 of a pressurized water nuclear reactor by means of conduit 12. The coolant-moderator is passed through the metal cylinder 34 of the primary measurement means 10, being withdrawn therefrom through conduit 14, thus providing a continuous flow of fluid through the primary measurement means 10. A known neutron source 50, such as a standard one Curie plutonium beryllium source, centrally located within the tube 40 of the metal cylinder 34, emits neutrons which, if not captured by the neutron absorption properties of the chemical shim in the coolant-moderator are detected by four neutron detectors 56, 58, 60 and 62 geometrically located equidistant from the source 50. The detectors in turn emit electrical signals via cables 64, 66, 68 and 70 to the signal conditioning means 18, these signals being representative of the count rate of neutrons reaching each respective detector.

The coolant-moderator passing through the primary measurement means 10, as noted above, contains a chemical shim (e.g., boron in the form of boric acid) which serves as a soluble neutron absorber to capture neutrons within the reactor in order to control reactivity. The count rate signal from the detectors 56, 58, 60, 62 are thus effected by the absorption of neutrons by the absorption properties of the chemical shim within the coolant-moderator as well as by the temperature of the coolant-moderator as explained above. According to well-known neutron absorptiometry principles, the rate at which a given concentration of the absorption properties of a particular chemical shim will absorb neutrons from a source of know strength can be calculated. In this manner a profile of absorption over a range of concentrations for a particular chemical shim and a particular source can be obtained. Therefore, with a equivalent source of neutrons yielding a known neutron flux, a proportional chemical shim neutron absorption property concentration signal can be determined from the count rate received by the detectors by referring this count rate to the absorption profile. In the instant invention the signal conditioning means 18 develops the proportional chemical shim absorption property concentration signal from the count rate signal received from the detectors 56, 58, 60 and 62 and then modifies the concentration signal to compensate for the error introduced by the temperature effects.

The signal conditioning means 18 develops the proportional absorber concentration signal in the following manner. Cables 64, 66, 68 and 70 pass the neutron count rate signal to the remote preamplifier 84 where the signals are combined and amplified. The resultant signal passes through the discriminator-shaper 96, the pulse-to-DC signal translator 98, and the curve straightener 100 wherein it is transformed into a proportional chemical shim absorption property concentration signal. At the same time, the temperature of the coolant moderator passing through the analyzer 10 is monitored by an appropriate temperature sensing means 57, such as a thermocouple or thermistor. The output of the temperature sensing means 57 is passed by leads 59, 61 to an operation amplifier 63 which amplifies the signal to generate a temperature signal ($T$). The amplified signal ($T$) is then transmitted by lead 65 to temperature compensation circuit 67 wherein a temperature compensation signal is generated. The first step performed by the temperature compensation signal circuit 67 is to generate a calibration temperature signal ($T_{cal}$) by means of variable voltage source 20. The calibration température signal ($T_{cal}$) is then compared to the temperature signal ($T$) in operational amplifier 22 which acts as a summer. The resultant signal is a temperature difference signal $K_1 \Delta T$. $K_1$ (and $K_2$ below) is an appropriate gain constant which is determined for the particular chemical shim and chemical shim concentration analyzer used, and which is selected by adjusting appropriate resistances associated with the operational amplifier 22; a procedure which is well-known in the art. The temperature difference signal $K_1 \Delta T$ is then multiplied in a state of the art multiplier 24 by the uncorrected chemical shim concentration signal (PPM) which has been generated by the first portion of signal conditioning means 18 described above. The resultant electrical signal has a magnitude proportional to $K_2 \Delta T \times$ (PPM) wherein PPM represents the chemical shim concentration in units of parts per million. The signals proportional to $K_1 \Delta T$ and $K_2 \Delta T$ = (PPM) are both delivered to summer 86 which is also an operational amplifier. Element 86 adds to two signals to obtain a summation signal $K_1 \Delta T + K_2 \Delta T \times$ (PPM). The signal represents the temperature compensation signal which must be added to the uncorrected chemical shim concentration signal. The addition of the compensation signal and the uncorrected chemical shim concentration value is accomplished by operational amplifier 88 to obtain the corrected chemical concentration signal.

Since the coolant-moderator is being continously passed through the primary measurement means 10, the proportional absorption property concentration signal emitted from the signal conditioning means 18 represents a varying indication of the concentration of the neutron absorption properties of the chemical shim present in the coolant-moderator at any particular time. Thus, from this signal a continuous monitoring is accomplished and control of the absorber concentration can be obtained. Automatic control of the chemical shim absorption property concentration is readily accomplished by feeding the proportional absorption property concentration signal into the concentration regulating system 28 where it is compared with other reactivity parameters to trigger the chemical shim supply 30 to add or subtract the chemical shim from the primary coolant-moderator loop 16. Manual control may be accomplished by providing for direct control of the chemical shim supply 30 by the system operator.

Fron the foregoing, it can be seen that the temperature conpensation system which we have developed, when added to a prior art chemical shim absorption property concentration device, provides a simple and efficient method and apparatus for continuously monitoring and controlling the concentration of the neutron absorption properties of a chemical shim used to vary reactivity in pressurized water nuclear reactors. Utilizing the principles of neutron absorptiometery a continuous signal proportional to chemical shim absorption property concentration is developed from a flowing sample of coolant-moderator passed between a known neutron source and a series of geometrically arrnaged neutron detectors. This continuous proportional signal is continuously modified by a temperature compensation signal which is commensurate with the equation, Error $=(0.54 \text{PPM}/°\text{F})\Delta T + (5 \times 10^{-4} \text{ PPM}/°\text{F}/\text{PPM})\Delta T \times \text{PPM}$. This corrected signal may be used to control a concentration regulating system when the neutron absorbing property concentration varies from desired operating conditions.

While we have illustrated and described a preferred embodiment of our invention, it is to be understood that such is merely illustrative and not restrictive and that variations and mdoifications may be made therein without departing from the spirit and scope of the invention. We, therefore, do not wish to be limited to the precise details set forth but desire to avail ourselves of ausch changes as fall within the purview of our invention.

What is claimed is:

1. In combination with a chemical shim concentration analyzer of the type wherein a sample of liquid containing dissolved chemical shim is bombarded with neutrons and a flux of unabsorbed neutrons is detected after passing through the liquid sample by neutron detectors spaced from the neutron source to generate a signal related to chemical shim concentration, the improvement comprising:
   a. means for generating a temperature signal ($T$) which varies as a function of the temperature of said liquid through which said detected neutrons pass unabsorbed;
   b. means responsive to said temperature signal generation means for generating a compensation signal commensurate with change of liquid sample chemical shim concentration due to change in temperature of said liquid sample; and
   c. means for correcting said signal related to chemical shim concentration by an amount commensurate with said compensation signal.

2. The improvement as recited in claim 1 wherein said means connected to said temperature signal generation means for generating a compensation signal includes:
   a. means for generating a temperature calibration signal;
   b. means for comparing said temperature signal to said temperature calibration signal and for generating a difference signal representative of the difference between said temperature signal and said temperature calibration signal; and
   c. means for generating a compensation signal which varies as function of said temperature difference signal.

3. The improvement as recited in claim 2 wherein said means for generating a compensation signal which varies as a function of said temperature difference signal includes:
   a. means for multiplying said signal related to chemical shim concentration by said temperature difference signal to obtain a product signal; and
   b. means responsive to said temperature difference signal and to said product signal for obtaining a signal commensurate with their sum.

4. In combination with a chemical shim concentration analyzer of the type wherein a sample of liquid containing dissolved chemical shim is bombarded with neutrons and a flux of unabsorbed neutrons is detected after passing through the liquid sample by neutron detectors spaced from the neutron source to generate a signal related to chemical shim concentration, the improvement comprising:
   a. means for generating a temperature signal ($T$) which varies as a function of the temperature of said liquid sample through which said detected neutrons pass unabsorbed;
   b. means responsive to said neutron detectors for generating a concentration signal uncorrected for temperature effects;
   c. means repsonsive to said temperature signal and to said uncorrected concentration signal for generating a compensation signal commensurate with change of liquid sample chemical shim concentration due to change in temperature of said liquid sample; and
   d. means for correcting said uncorrected concentration signal by an amount commensurate with said compensation signal.

5. The improvement as recited in claim 1 wherein said means for correcting said signal related to chemical shim concentration by an amount commensurate with said compensation signal includes a summer which adds said compensation signal to said signal related to said chemical shim concentration.

6. The improvement as recited in claim 1 wherein said means repsonsive to said temperature measuring means for generating a compensation signal includes:
   a. means for generating a calibration signal commensurate with a calibration temperature ($T_{cal}$);
   b. means responsive to said calibration signal ($T_{cal}$) and to said temperature signal ($T$) for generating a signal commensurate with their difference ($\Delta T$);
   c. means responsive to said difference signal ($\Delta T$) and said signal related to chemical shim concentration (PPM) for generating a signal commensurate with their product [($\Delta T$) × (PPM)];
   d. means responsive to said product signal [($\Delta T$) × (PPM)] and to said temperature difference signal ($\Delta T$) for generating a compensation signal commensurate with their sum ($K_1\Delta T + K_2 [(\Delta T \times (\text{PPM})])$ where $K_1$ and $K_2$ are gain constants; and
   e. means responsive to said compensation signal ($K_1 \Delta T + K_2 [(\Delta T) \times (\text{PPM})]$) and to said signal related to said chemical shim concentration (PPM) for adding said compensation signal and said signal related to said chemical shim concentration signal to generate a chemical shim concentration signal corrected for effects caused by the temperature of said liquid sample.

7. A method of producing a signal which is proportional to the chemical shim concentration of a liquid sample, comprising the steps of:
   a. bombarding said liquid sample with neutrons;

b. detecting a portion of said neutrons which pass through said liquid sample unabsorbed and generating a signal indicative thereof;

c. generating a signal proportional to chemical shim concentration uncompensated for temperature from said signal indicative of unabsorbed neutrons;

d. monitoring the temperature of said sample and generating a signal which varies with said temperature;

e. generating a chemical shim concentration compensation signal from said temperature signal; and f. correcting said signal proportional to chemical shim concentration uncompensated for temperature by said chemical shim concentration compensation signal.

8. The method as claim in claim 7 wherein said step of generating a chemical shim concentration compensation signal includes the steps of:

a. multipying said temperature signal by said signal proportional to chemical shim concentration uncompensated for temperature to generate a multiplicative signal; and b. adding to said multiplicative signal said signal which varies with temperature to obtain a compensation signal.

9. The method as claimed in claim 8 wherein said step of correcting said signal proportional to chemical shim concentration uncompensated for temperature by said chemical shim concentration compensation signal includes the step of:

a. adding said compensation signal to said signal proportional to chemical shim concentration uncompensated for temperature.

* * * * *

UNITED STATES PATENT OFFICE
CERTIFICATE OF CORRECTION

PATENT NO. : 3,898,467

DATED : August 5, 1975

INVENTOR(S) : Glen Elwin Schukei and Joseph Edward Kowles

It is certified that error appears in the above-identified patent and that said Letters Patent are hereby corrected as shown below:

| | | |
|---|---|---|
| Column 1, line 39 | Change | "absoprtion" to --absorption-- |
| Column 2, line 14 | Change | "measurments" to --measurements-- |
| Column 2, line 22 | Change | "thak" to --tank-- |
| Column 2, lines 66 and 65 | Change | "commersurate" to --commensurate-- |
| Column 3, line 7 | Insert | --is-- before "modified" |
| Column 5, line 48 | Change | "know" to --known-- |
| Column 8, line 54 | Insert | --)-- between "T" and "x" |
| Column 1, line 10 | Change | "netron" to --neutron-- |
| Column 1, line 39 | Change | "nutron" to --neutron-- |
| Column 1, line 51 | Change | "conecntration" to --concentration-- |
| Column 3, line 43 | Change | "conecntration" to --concentration-- |
| Column 3, line 50 | Change | "conpensating" to --compensating-- |
| Column 3, line 52 | Change | "connnected" to --connected-- |
| Column 3, line 60 | Change | "temperture" to --temperature-- |
| Column 4, line 36 | Change | "aquidistant" to --equidistant-- |
| Column 5, line 52 | Change | "a" before "equivalent" to --an-- |
| Column 6, line 36 | Change | "=" to --x-- |
| Column 6, line 37 | Change | "to" to --the-- |
| Column 6, line 66 | Change | "Fron" to --From-- |
| Column 6, line 67 | Change | "conpensation" to --compensation-- |
| Column 7, line 10 | Change | "arrnaged" to --arranged-- |
| Column 7, line 23 | Change | "mdoifications" to --modifications-- |
| Column 7, line 27 | Change | "ausuch" to --such-- |
| Column 8, line 23 | Change | "repsonsive" to --responsive-- |
| Column 8, line 40 | Change | "repsonsive" to --responsive-- |
| Column 9, line 16 | Change | "claim" to --claimed-- |

Signed and Sealed this

Twenty-seventh Day of July 1976

[SEAL]

Attest:

RUTH C. MASON
*Attesting Officer*

C. MARSHALL DANN
*Commissioner of Patents and Trademarks*